(12) United States Patent
Futaki et al.

(10) Patent No.: US 11,057,955 B2
(45) Date of Patent: Jul. 6, 2021

(54) RADIO ACCESS NETWORK NODE, RADIO TERMINAL, CORE NETWORK NODE, AND METHODS AND NON-TRANSITORY COMPUTER-READABLE MEDIA THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/474,617

(22) PCT Filed: Nov. 21, 2017

(86) PCT No.: PCT/JP2017/041817
§ 371 (c)(1),
(2) Date: Jun. 28, 2019

(87) PCT Pub. No.: WO2018/128017
PCT Pub. Date: Jul. 12, 2018

(65) Prior Publication Data
US 2019/0342932 A1 Nov. 7, 2019

(30) Foreign Application Priority Data

Jan. 5, 2017 (JP) .............................. JP2017-000797

(51) Int. Cl.
*H04W 76/15* (2018.01)
*H04W 28/18* (2009.01)
(Continued)

(52) U.S. Cl.
CPC ........... *H04W 76/15* (2018.02); *H04W 28/18* (2013.01); *H04W 84/045* (2013.01); *H04W 88/06* (2013.01)

(58) Field of Classification Search
CPC ... H04W 52/50; H04W 88/02; H04W 72/046; H04W 52/36; H04B 7/088; H04B 7/0695
See application file for complete search history.

(56) References Cited

U.S. PATENT DOCUMENTS

| 2011/0310850 A1* | 12/2011 | Klingenbrunn ....... H04W 36/30 370/332 |
| 2012/0294278 A1* | 11/2012 | Wang ................ H04W 28/0257 370/331 |
| 2014/0286310 A1 | 9/2014 | Lerzer et al. |

FOREIGN PATENT DOCUMENTS

| JP | 2012-504358 A | 2/2012 |
| WO | 2015/160329 A1 | 10/2015 |

OTHER PUBLICATIONS

3GPP TR 23.799, V14.0.0 (Dec. 2016), "3rd Generation Partnership Project; Technical Specification Group Services and System Aspects; Study on Architecture for Next Generation System (Release 14)," Dec. 2016, pp. 1-522.

(Continued)

*Primary Examiner* — Yemane Mesfin
*Assistant Examiner* — Henry Baron
(74) *Attorney, Agent, or Firm* — Sughrue Mion, PLLC

(57) ABSTRACT

A second RAN node (2) associated with a secondary RAT configures a radio bearer of the secondary RAT in accordance with a bearer-level QoS parameter conforming to a QoS framework of a primary RAT. In addition, the second RAN node (2) translates the bearer-level QoS parameter to a flow-level QoS parameter conforming to a QoS framework of the secondary RAT and associates the obtained flow-level QoS parameter with the radio bearer of the secondary RAT.

11 Claims, 10 Drawing Sheets

(51) Int. Cl.
　　　*H04W 84/04*　　　(2009.01)
　　　*H04W 88/06*　　　(2009.01)

(56) References Cited

OTHER PUBLICATIONS

3GPP TR 38.801 V1.0.0 (Dec. 2016), "3rd Generation Partnership Project; Technical Specification Group Radio Access Network; Study on New Radio Access Technology; Radio Access Architecture and Interfaces (Release 14)," Dec. 2016, pp. 1-72.
3GPP TSG-RAN2#96, R2-168400, NTT Docomo, Inc., "QoS and bearer for DC between LTE and NR," Nov. 14-18, 2016, pp. 1-3.
3GPP TSG-RAN WG2 Meeting #96, R2-168686, Nokia, Alcatel-Lucent Shanghai Bell, "EPC—NR PDCP interaction for tight interworking: User Plane aspects," Nov. 14-18, 2016, 7 pages.
International Search Report of PCT/JP2017/041817 dated Feb. 13, 2018.

* cited by examiner

RADIO ACCESS NETWORK NODE, RADIO TERMINAL, CORE NETWORK NODE, AND METHODS AND NON-TRANSITORY COMPUTER-READABLE MEDIA THEREFOR

CROSS REFERENCE TO RELATED APPLICATIONS

This application is a National Stage of International Application No. PCT/JP2017/041817 filed Nov. 21, 2017, claiming priority based on Japanese Patent Application No. 2017-000797 filed Jan. 5, 2017, the disclosures of which are incorporated herein in their entirety by reference.

TECHNICAL FIELD

The present disclosure relates to a radio communication system and, in particular, to communication in which a radio terminal simultaneously uses a plurality of cells of different Radio Access Technologies (RATs) operated by different radio stations.

BACKGROUND ART

The 3rd Generation Partnership Project (3GPP) has started in 2016 the standardization for the fifth generation mobile communication system (5G), i.e., 3GPP Release 14, to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the 5G-RAN, no bearers are used in the 5G-CN or in the interface between the 5G-CN and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. In the QoS framework of the 5G system, a PDU flow is identified by a PDU flow ID contained in a header encapsulating a Service Data Unit of a tunnel of a NG3 interface. The NG3 interface is a user plane interface between the 5G-CN and the gNB (i.e., 5G-RAN). Association between a 5G UE and a data network is referred to as a "PDU session". The term "PDU session" corresponds to the term "PDN connection" in LTE and LTE-Advanced. A plurality of PDU flows can be configured in one PDU session.

The PDU flow is also referred to as a "QoS flow". The QoS flow is the finest granularity in QoS treatment in the 5G system. User plane traffic having the same NG3 marking value in a PDU session corresponds to a QoS flow. The NG3 marking corresponds to the above-described PDU flow ID, and it is also referred to as a QoS flow ID or a Flow Identification Indicator (FII).

FIG. 1 shows a basic architecture of the 5G system. A UE establishes one or more Signalling Radio Bearers (SRBs) and one or more Data Radio Bearers (DRBs) with a gNB. The 5G-CN and the gNB establish a control plane interface and a user plane interface for the UE. The control plane interface between the 5G-CN and the gNB (i.e., RAN) is referred to as an NG2 interface or an NG-c interface and is used for transfer of Non-Access Stratum (NAS) information and for transfer of control information (e.g., NG2 AP Information Element) between the 5G-CN and the gNB. The user plane interface between the 5G-CN and the gNB (i.e., RAN) is referred to as an NG3 interface or an NG-u interface and is used for transfer of packets of one or more PDU flows in a PDU session of the UE.

Note that, the architecture shown in FIG. 1 is merely one of the 5G architecture options or deployment scenarios (see Annex J of Non-Patent Literature 1 and see Non-Patent Literature 2). The architecture shown in FIG. 1 is referred to as "Standalone NR (in NextGen System)" or "Option 2". In contrast, FIGS. 2 and 3 show architecture Options 3 and 3A, which are referred to as "Non-standalone NR in EPS". In FIGS. 2 and 3, control interfaces are shown as dashed lines, while user plane interfaces are shown as solid lines. Architecture Options 3 and 3A are Dual connectivity (DC) deployments including E-UTRA as the anchor RAT (or the primary RAT or the master RAT) and NR as a secondary RAT. In Options 3 and 3A, E-UTRA (LTE eNB) and NR (gNB) are connected to the EPC. The NR user plane connection to the EPC goes through the LTE eNB in Option 3, whereas in Option 3A, it passes directly through a user plane interface between the gNB and the EPC.

Non-Patent Literature 3 has suggested that in Architecture Options 3 and 3A, which are DC architecture where E-UTRA and NR are connected to the EPC, the NR gNB supports the LTE DC functionalities and procedures. Non-Patent Literature 3 has also suggested that in the DC architecture where E-UTRA and NR are connected to the EPC, the NR gNB applies the LTE QoS framework (i.e., bearer based QoS) to the EPC, the LTE eNB and the UE. Further, Non-Patent Literature 3 has suggested the following proposals:

- LTE DC procedures (e.g., SeNB addition) are applied when adding NR gNB as secondary node, in which necessary QoS service (i.e., bearer) are configured;
- E-UTRAN Radio Access Bearer (E-RAB) is established between EPC and NR gNB for Secondary Cell Group (SCG) bearer option according to LTE;
- X2-U is established between LTE eNB and NR gNB for split bearer option according to LTE; and
- DRB is established between NR gNB and UE according to SCG bearer option or split bearer option according to LTE.

Non-Patent Literature 4 has suggested that there is one-to-one mapping (1:1 mapping) between S1-U and DRB of SCG (i.e., SCG bearer). Non-Patent Literature 4 has also suggested that QoS attributes of EPC are in use for EPS bearers and, accordingly, there is a need to map the QoS parameters used in EPC to the radio bearer parameters used in the NR.

CITATION LIST

Non Patent Literature

[Non-Patent Literature 1] 3GPP TR 23.799 V14.0.0 (2016-12) "3rd Generation Partnership Project; Technical Specification Group Services and System Aspects; Study on Architecture for Next Generation System (Release 14)", December 2016

[Non-Patent Literature 2] 3GPP TR 38.801 V1.0.0 (2016-12) "3rd Generation Partnership Project; Technical Specification Group Radio Access Network; Study on New Radio Access Technology; Radio Access Architecture and Interfaces (Release 14)", December 2016

[Non-Patent Literature 3] 3GPP R2-168400, NTT DOCOMO, INC., "QoS and bearer for DC between LTE and NR", 3GPP TSG-RAN WG2 Meeting #96, Reno, USA, 14-18 Nov. 2016

[Non-Patent Literature 4] 3GPP R2-168686, Nokia, Alcatel-Lucent Shanghai Bell, "EPC—NR PDCP interaction for tight interworking: User Plane aspects", 3GPP TSG-RAN WG2 Meeting #96, Reno, USA, 14-18 Nov. 2016

SUMMARY OF INVENTION

Technical Problem

The present inventors have studied the DC architecture in which E-UTRA and NR are connected to the EPC and found several problems.

For example, Non-Patent Literature 3 proposes that the NR gNB apply the LTE QoS framework (i.e., bearer based QoS) to the EPC, the LTE eNB, and the UE in the case of DC architecture (i.e., architecture options 3 and 3A) in which E-UTRA and NR are connected to the EPC. Non-Patent Literature 3 also proposes that LTE DC procedure (e.g., SeNB addition) for configuring necessary QoS services (i.e., bearers) is applied when the NR gNB is added as a secondary node. Meanwhile, Non-Patent Literature 4 proposes that the QoS attributes of EPC is in use for EPS bearers and there is a need to map the QoS parameters used in EPC to the radio bearer parameters used in NR. It is not clear, however, how the gNB, which is a secondary node, treats NR DRBs (referred to as SCG DRBs) established between the NR gNB and the UE for the SCG bearer option and the split bearer option of LTE, in accordance with the LTE QoS framework (i.e., bearer based QoS).

Accordingly, one of the objects to be attained by embodiments disclosed herein is to provide an apparatus, a method, and a program that contribute to enhancing the appropriateness of the QoS treatment of NR DRBs (SCG DRBs) established between the secondary gNB and the UE in DC architecture where E-UTRA and NR are connected to EPC. It should be noted that this object is merely one of the objects to be attained by the embodiments disclosed herein. Other objects or problems and novel features will be made apparent from the following description and the accompanying drawings.

Solution to Problem

In a first aspect, a second radio access network (RAN) node is used in a radio communication system. The radio communication system supports dual connectivity involving a primary RAT and a secondary RAT and includes a common core network associated with the primary RAT. The second RAN node is associated with the secondary RAT. The second RAN node includes a memory and at least one processor coupled to the memory. The at least one processor is configured to receive, from a first RAN node associated with the primary RAT, a radio bearer setup request indicating a bearer-level QoS parameter conforming to a Quality of Service (QoS) framework of the primary RAT, and configure a radio bearer of the secondary RAT based on the radio bearer setup request. The at least one processor is further configured to translate the bearer-level QoS parameter to a flow-level QoS parameter conforming to a QoS framework of the secondary RAT, and associates the flow-level QoS parameter with the radio bearer.

In a second aspect, a radio terminal is used in a radio communication system. The radio communication system supports dual connectivity involving a primary RAT and a secondary RAT and includes a common core network associated with the primary RAT. The radio terminal includes at least one wireless transceiver and at least one processor. The at least one wireless transceiver is configured to simultaneously communicate with a first radio access network (RAN)

node associated with the primary RAT and a second RAN node associated with the secondary RAT. The at least one processor is configured to receive, from the first RAN node, configuration information of a radio bearer of the secondary RAT for the dual connectivity. The configuration information includes both a network bearer identifier conforming to a Quality of Service (QoS) framework of the primary RAT and a flow-level QoS parameter to be associated with the bearer identifier and conforming to a QoS framework of the secondary RAT.

In a third aspect, a core network node is used in a radio communication system. The radio communication system supports dual connectivity involving a primary RAT and a secondary RAT and includes a common core network associated with the primary RAT. The radio terminal includes at least one radio transceiver and a controller. The core network node includes a memory and at least one processor coupled to the memory. The at least one processor is configured to, in response to receiving a Non-Access Stratum (NAS) request from a radio terminal via a first radio access network (RAN) node associated with the primary RAT, determine a flow-level QoS parameter to be associated with a bearer-level Quality of Service (QoS) parameter conforming to a QoS framework of the primary RAT, the flow-level QoS parameter conforming to a QoS framework of the secondary RAT. The at least one processor is further configured to send, to the first RAN node, a bearer setup request including both the bearer-level QoS parameter and the flow-level QoS parameter.

In a fourth aspect, a method for a second radio access network (RAN) node includes:

(a) receiving, from a first RAN node associated with the primary RAT, a radio bearer setup request indicating a bearer-level QoS parameter conforming to a Quality of Service (QoS) framework of the primary RAT;

(b) configuring a radio bearer of the secondary RAT based on the radio bearer setup request;

(c) translating the bearer-level QoS parameter to a flow-level QoS parameter conforming to a QoS framework of the secondary RAT; and (d) associating the flow-level QoS parameter with the radio bearer.

In a fifth aspect, a method for a radio terminal includes receiving, from a first radio access network (RAN) node associated with the primary RAT, configuration information of a radio bearer of the secondary RAT for the dual connectivity. The configuration information includes both a network bearer identifier conforming to a Quality of Service (QoS) framework of the primary RAT and a flow-level QoS parameter to be associated with the bearer identifier and conforming to a QoS framework of the secondary RAT.

In a sixth aspect, a method for a core network includes:

(a) in response to receiving a Non-Access Stratum (NAS) request from a radio terminal via a first radio access network (RAN) node associated with the primary RAT, determining a flow-level QoS parameter to be associated with a bearer-level Quality of Service (QoS) parameter conforming to a QoS framework of the primary RAT, the flow-level QoS parameter conforming to a QoS framework of the secondary RAT; and (b) sending, to the first RAN node, a bearer setup request including both the bearer-level QoS parameter and the flow-level QoS parameter.

In a seventh aspect, a program includes instructions (software codes) that, when loaded into a computer, cause the computer to perform the method according to the above-described fourth, fifth, or sixth aspect.

Advantageous Effects of Invention

According to the above-deceived aspects, it is possible to provide an apparatus, a method, and a program that contribute to enhancing the appropriateness of the QoS treatment of NR DRBs (SCG DRBs) established between the secondary gNB and the UE in DC architecture where E-UTRA and NR are connected to EPC.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on DC architecture where E-UTRA and NR are connected to EPC. However, these embodiments may be applied to other radio communication systems supporting DC architecture where different RATs using different QoS frameworks are connected to a common core network.

First Embodiment

Figure 4:
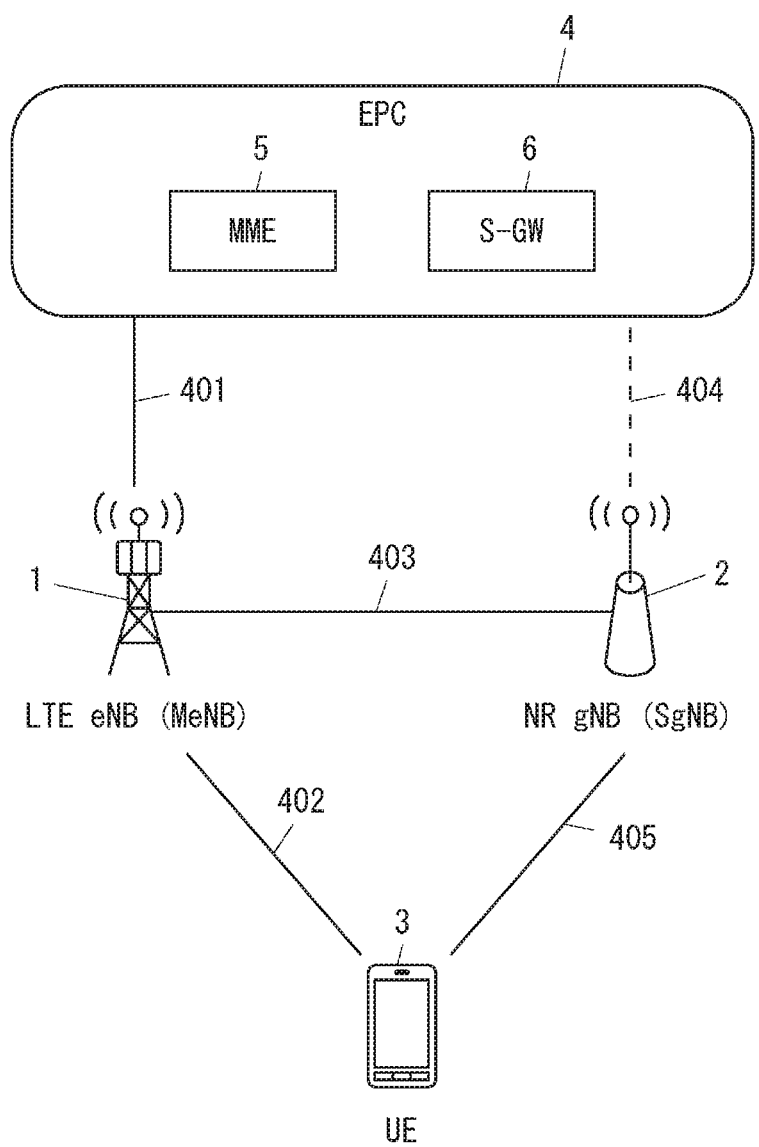
FIG. 4 is a diagram showing a configuration example of a radio communication network according to a plurality of embodiments.

FIG. 4 shows a configuration example of a radio communication network according to a plurality of embodiments including this embodiment. In the example shown in FIG. 4, the radio communication network includes an LTE eNB 1, an NR gNB 2, a UE 3, and an EPC 4. The radio communication network shown in FIG. 4 supports dual connectivity (DC) and also supports one or both of the above-described option 3 and option 3A. The options 3 and 3A support dual connectivity involving E-UTRA and NR, which are an anchor RAT (or a primary RAT) and a secondary RAT, respectively. In the options 3 and 3A, both E-UTRA (i.e., the LTE eNB 1) and NR (i.e., the gNB 2) are connected to the EPC 4. In the option 3, the NR user plane connection to the EPC 4 goes through the LTE eNB 1, and accordingly user packets of the UE 3 are transferred via an inter-base station interface 403 and via an interface 401 between the eNB 1 and the EPC. In contrast, in the option 3A, the NR user plane connection to the EPC 4 directly passes through a user plane interface 404 between the gNB 2 and the EPC 4.

The UE 3 has a capability to simultaneously communicate with the eNB 1 associated with the primary RAT (E-UTRA) and the gNB 2 associated with the secondary RAT (NR). In other words, the UE 3 has a capability to aggregate a cell of the eNB 1 associated with the primary RAT (E-UTRA) with a cell of the gNB 2 associated with the secondary RAT (NR). Further, in other words, the UE 3 has a capability to be configured with both a cell of the eNB 1 associated with the primary RAT (E-UTRA) and a cell of the gNB 2 associated with the secondary RAT (NR). In the architecture options 3 and 3A, an air interface 402 between the eNB 1 and the UE 3 provides a control plane connection and a user plane connection. Meanwhile, an air interface 405 between the gNB 2 and the UE 3 includes at least a user plane connection, but it does not need to include a control plane connection. In the DC architecture in which E-UTRA and NR are connected to the EPC 4, the master eNB (MeNB) 1 provides one or more E-UTRA MCG cells for the UE 3, while the secondary gNB (SgNB) 2 provides one or more NR SCG cells for the UE 3.

The EPC 4 includes a plurality of core network nodes including an MME 5 and an S-GW 6. The MME 5 is a control plane node while the S-GW 6 is a user plane node. The MME 5 performs mobility management and bearer management of UEs that have already attached to the core network (i.e., UEs in EMM-REGISTERED state). The mobility management is used to keep track of the current position of each UE and includes maintaining a mobility management context (MM context) regarding each UE. The bearer management includes controlling establishment of an EPS bearer for enabling each UE to communicate with an external network (Packet Data Network (PDN)) through E-UTRAN including the eNB 1 and through the EPC 4, and maintaining an EPS bearer context regarding each UE. The S-GW 6 is a gateway with E-UTRAN and is connected via an S1-U interface to one or both of the eNB 1 and the gNB 2.

The following describes QoS treatment of a data radio bearer (DRB) configured in the gNB 2 (i.e., SgNB 2) serving as a secondary node. The gNB 2 is configured to receive, from the eNB 1 (i.e., the MeNB 1) serving as the master node, a radio bearer setup request indicating bearer-level QoS parameters conforming to a QoS framework of the primary RAT (i.e., E-UTRA). This radio bearer setup request is a message causing the gNB 2 to configure a DRB for DC. This radio bearer setup request may be referred to as an SgNB Addition Request.

The bearer-level QoS parameters contained in the radio bearer setup request include an E-RAB ID and E-RAB Level QoS Parameters. The E-RAB Level QoS Parameters include a QCI and an Allocation and Retention Priority (ARP) to be applied to an E-RAB. The E-RAB Level QoS Parameters may further include GBR QoS Information. The GBR QoS Information indicates uplink and downlink Maximum Bit Rates (MBRs) to be applied to an E-RAB, and also includes uplink and downlink Guaranteed Bit Rates (GBRs).

The SgNB 2 is configured to configure a DRB of the secondary RAT (i.e., NR) on the basis of the radio bearer setup request received from the MeNB 1. The gNB 2 may map one or more QoS parameters used in the EPC 4 to one or more radio bearer parameters to be used in NR.

Further, the SgNB 2 is configured to translate, convert, replace, or map the one or more bearer-level QoS parameters, which conform to the QoS framework of the primary RAT (i.e., E-UTRA), to one or more flow-level QoS parameters conforming to a QoS framework of the secondary RAT (i.e., NR). The SgNB 2 is configured to associate the derived flow-level QoS parameter(s) with an NR DRB (i.e., SCG DRB) configuration. The flow-level QoS parameter(s) include QoS parameter(s) regarding the above-described QoS flow (or PDU flow). The QoS flow (or the PDU flow) is the finest granularity in the QoS treatment in the 5G system.

The flow-level QoS parameter(s) include, for example, a flow identifier. The flow identifier may be a QoS flow ID, a PDU flow ID, or a Flow Identification Indicator (FII). The flow identifier may be mapped one-to-one to the bearer identifier (e.g., E-RAB ID or EPS bearer Identity). Otherwise, the bearer identifier may be re-used as the flow identifier.

Further, the flow-level QoS parameters may include at least one of a flow QCI, a flow priority, a flow MBR, and a flow ARP. The flow QCI may be referred to as a Flow Quality Indicator (FQI) or a Flow QoS Indicator (FQI). The gNB 2 may convert a bearer QCI into a flow QCI in accordance with a predetermined mapping table. The gNB 2 may convert a bearer QCI into a flow priority in accordance with a predetermined mapping table. The gNB 2 may convert a bearer MBR into a flow MBR. The gNB 2 may convert a bearer ARP into a flow ARP.

The flow-level QoS parameters derived by the SgNB 2 may further include information regarding a QoS management type. The flow-level QoS parameters may include, for example, an information element indicating whether an uplink QoS management type is a reflective QoS. In other words, the flow-level QoS parameters may include an information element indicating whether the uplink QoS management type is the reflective QoS (i.e., reflective mapping of flows to DRBs) or a pre-configured (i.e., preconfigured mapping of flows to DRBs). This information element may be a one-bit flag. In the reflective QoS, the mapping of QoS information of a downlink flow to a data radio bearer explicitly indicated by a marking added to a downlink packet is reflected in the mapping of an uplink flow to a data radio bearer. In contrast, in the pre-configured mapping, both the mapping of a downlink flow to a data radio bearer and the mapping of an uplink flow to a data radio bearer are statically configured in the UE via RRC signalling.

Figure 1:
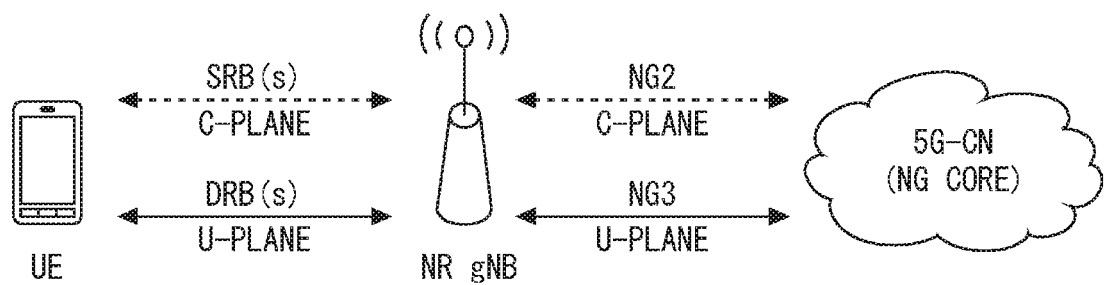
FIG. 1 is a diagram showing basic architecture of the 5G System according to the Background Art.
Figure 2:
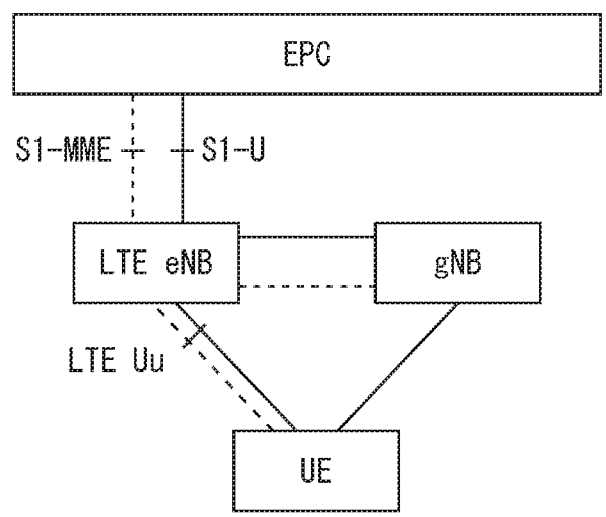
FIG. 2 is a diagram showing Architecture Option 3 for Dual Connectivity where E-UTRA (LTE eNB) and NR (gNB) are connected to EPC, according to the Background Art.
Figure 3:
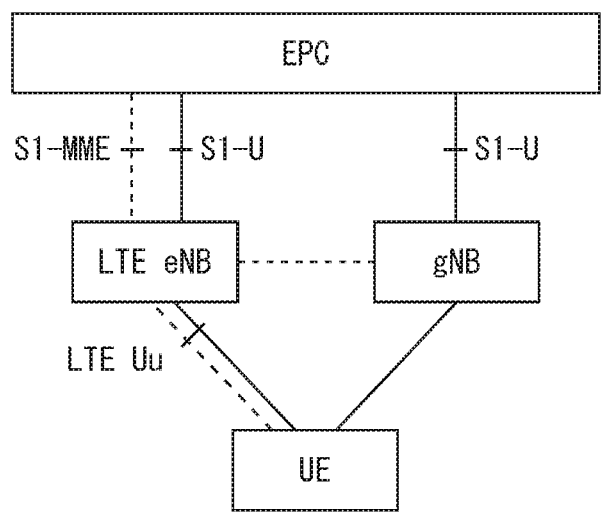
FIG. 3 is a diagram showing Architecture Option 3A for Dual Connectivity where E-UTRA (LTE eNB) and NR (gNB) are connected to EPC, according to the Background Art.

As can be understood from the above description, the SgNB 2 according to this embodiment maps one or more bearer-level QoS parameters, which conform to the QoS framework of E-UTRA and have been received from the MeNB 1, to one or more flow-level QoS parameters conforming to the QoS framework of NR. In other words, the SgNB 2 derives the one or more flow-level QoS parameters conforming to the QoS framework of NR from the one or more bearer-level QoS parameters conforming to the QoS framework of E-UTRA received from the MeNB 1. This allows the SgNB 2 to manage the UE 3, which is performing dual connectivity connected to the EPC 4 while using E-UTRA as the primary RAT and NR as the secondary RAT, in accordance with the same QoS framework as it manages other UEs communicating on the Standalone architecture as shown in FIG. 1.

Figure 5:
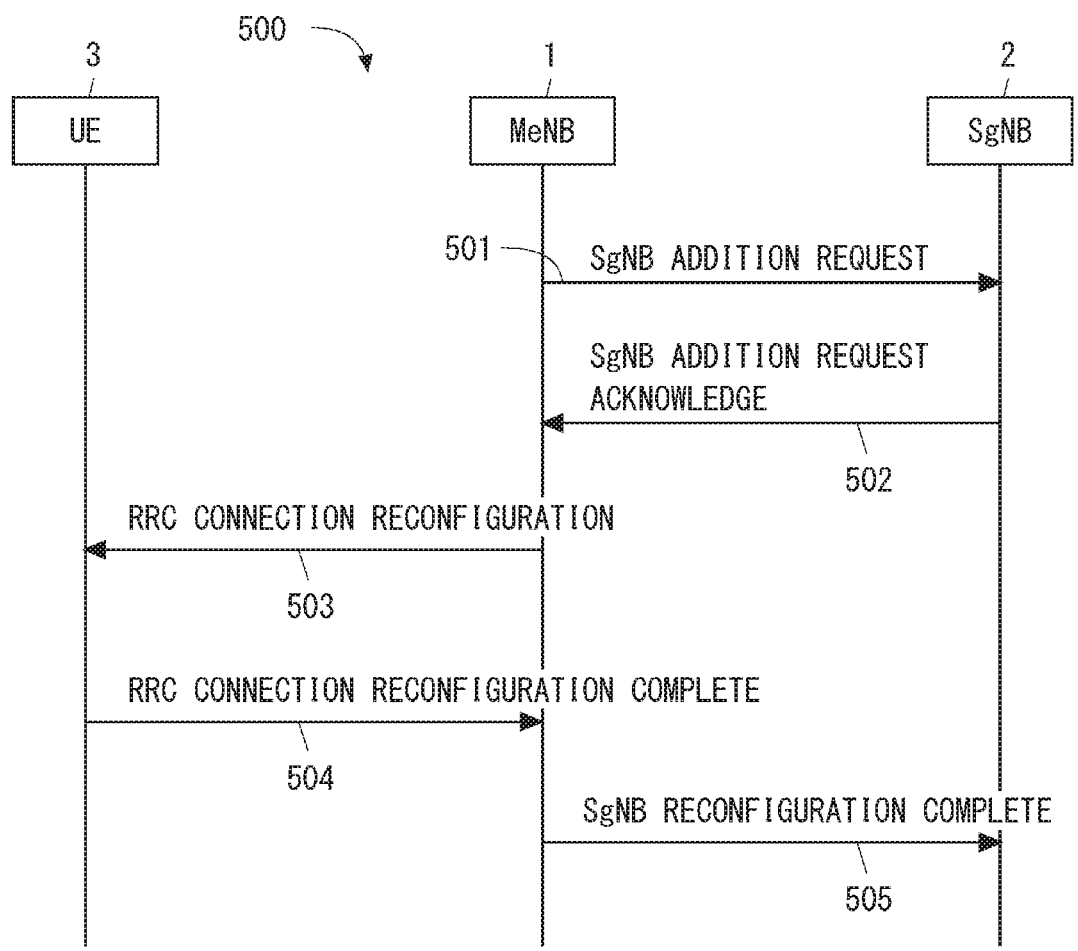
FIG. 5 is a sequence diagram showing an example of an SCG establishment procedure according to a first embodiment.

FIG. 5 is a sequence diagram showing a process 500 that is one example of an SCG establishment procedure according to this embodiment. The procedure shown in FIG. 5 basically follows the SeNB Addition procedure in LTE DC. In Step 501, the MeNB 1 sends an SgNB Addition Request message to the SgNB 2. The SgNB Addition Request message requests the SgNB 2 to configure a radio bearer (i.e., SCG DRB) for DC that uses E-UTRA and NR as respectively the primary RAT and the secondary RAT.

The SgNB Addition Request message corresponds to the above-described "radio bearer setup request". Specifically, the SgNB Addition Request message includes an "SgNB Security Key (for SCG bearer)" information element (IE), an "E-RAB To Be Added List" IE, and an "MeNB to SgNB Container" IE. The "E-RAB To Be Added List" IE includes an E-RAB ID and E-RAB Level QoS Parameters of each E-RAB required by the MeNB 1 to be established. The "MeNB to SgNB Container" IE includes an RRC: SCG-ConfigInfo message. The RRC: SCG-ConfigInfo message is used by the MeNB in order to request the SgNB to establish, modify, or release an SCG. The SCG-ConfigInfo message includes, for example, an EPS bearer Identity, a DRB Identity, and a DRB type. The security policy (e.g., security algorithm) used in a cell (e.g., radio link, AS layer) of the secondary RAT (NR) may be different from that used in a cell (e.g., radio link, AS layer) of the primary RAT (E-UTRA). In this case, the SgNB Security Key IE may include information regarding the security policy used in a cell of the secondary RAT (NR). Further, the SgNB 2 may include this security policy-related information into an RRC: SCG-Config message to be transmitted to the UE 3.

In Step 502, the SgNB 2 sends an SgNB Addition Request Acknowledge message to the MeNB 1. The SgNB Addition Request Acknowledge message is a response message to the SgNB Addition Request message. The SgNB Addition Request Acknowledge message includes configuration information of an SCG DRB created by the SgNB 2. This SCG DRB configuration information is sent to the UE 3 via the MeNB 1. The SCG DRB configuration information includes flow-level QoS parameters.

Specifically, the SgNB Addition Request Acknowledge message includes an "E-RAB Admitted To Be Added List" IE and an "SgNB to MeNB Container" IE. The "SgNB to MeNB Container" IE includes an RRC: SCG-Config message. The RRC: SCG-Config message is used to transfer an SCG radio configuration created by the SgNB 2. The RRC: SCG-Config message includes DRB and EPS bearer Identities to be associated with each SCG DRB and further includes a Flow ID to be associated with each SCG DRB. The EPS bearer Identity is a network bearer identifier conforming to the QoS framework of E-UTRA. The Flow ID is one of the flow-level QoS parameters described above. The "SgNB to MeNB Container" IE may include a QoS management type associated with each SCG DRB. The QoS management type is one of the flow-level QoS parameters described above.

In Step 503, the MeNB 1 sends an RRC Connection Reconfiguration message to the UE 3 in response to receiving the SgNB Addition Request Acknowledge message from the SgNB 2. This RRC Connection Reconfiguration message includes the RRC: SCG-Config message, which has been sent from the SgNB 2 to the MeNB 1 via the SgNB Addition Request Acknowledge message. The UE 3 configures an SCG DRB in an NR cell of the SgNB 2 in accordance with the RRC: SCG-Config message. The UE 3 further associates (or maps) the EPS bearer Identity with (or to) the Flow ID in accordance with the RRC: SCG-Config message.

In Step 504, the UE 3 sends an RRC Connection Reconfiguration Complete message to the MeNB 1 in an E-UTRA cell (i.e., Primary Cell (PCell)) of the MeNB 1. Meanwhile, the UE 3 starts a procedure for synchronizing with the SgNB 2 (e.g., Random Access Procedure).

In Step 505, the MeNB 1 sends an SgNB Reconfiguration Complete message to the SgNB 2 in response to receiving the RRC Connection Reconfiguration Complete message from the UE 3.

Figure 6:
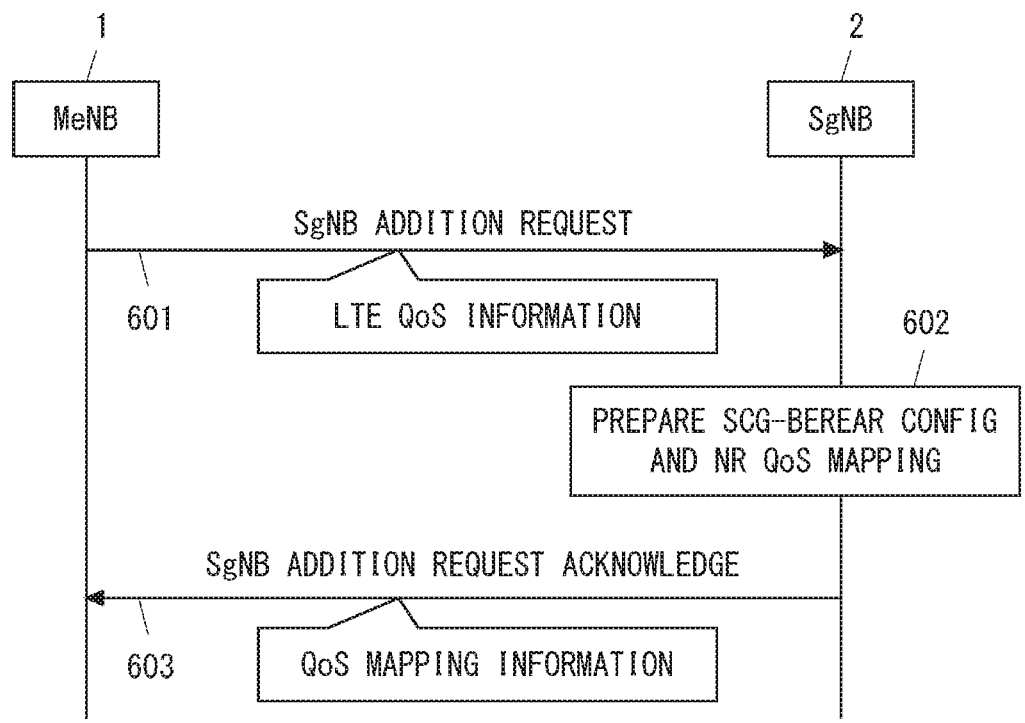
FIG. 6 is a sequence diagram showing details of signalling between an MeNB and an SgNB in the SCG establishment procedure according to the first embodiment.

FIG. 6 is a sequence diagram showing details of signalling between the MeNB 1 and the SgNB 2 in the SCG establishment procedure. Step 601 corresponds to Step 501 shown in FIG. 5. That is, the MeNB 1 sends the SgNB Addition Request message to the SgNB 2. This SgNB Addition Request message includes LTE QoS information and requests the SgNB 2 to configure an SCG DRB. The LTE QoS information is bearer-level QoS parameters (e.g., E-RAB ID and E-RAB Level QoS parameters) conforming to the QoS framework of E-UTRA.

In Step 602, the SgNB 2 prepares an SCG bearer configuration and maps NR QoS information to the LTE QoS information. The NR QoS information is flow-level QoS parameters (e.g., Flow ID and PDU-flow-level QoS parameters) conforming to the QoS framework of NR.

In Step 603, the SgNB 2 sends an SgNB Addition Request Acknowledge message to the MeNB 1. Step 603 corresponds to Step 502 shown in FIG. 5. This SgNB Addition Request Acknowledge message includes information indicating mapping between the NR QoS information and the LTE QoS information.

Figure 7:
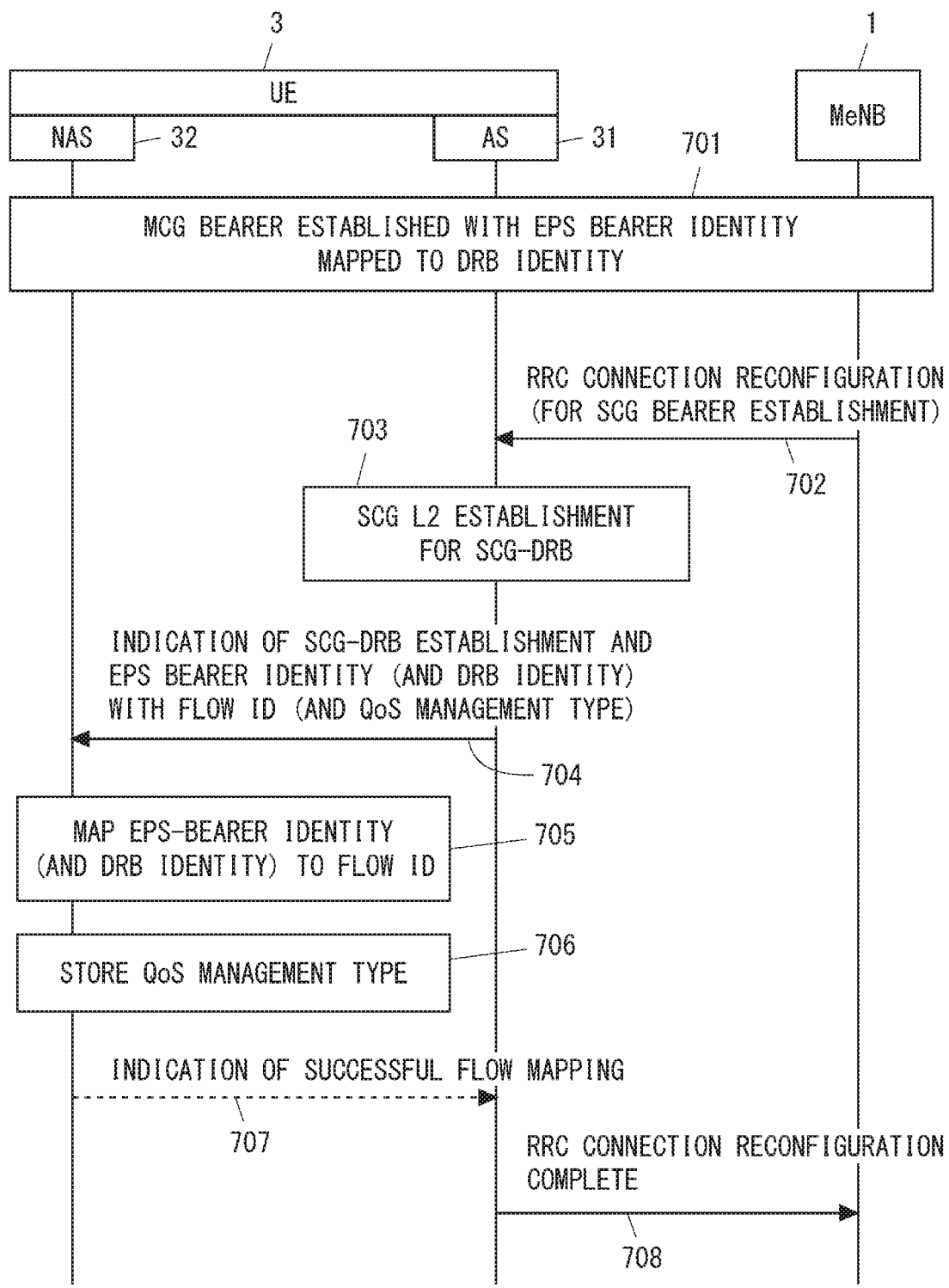
FIG. 7 is a sequence diagram showing details of signalling within a UE in the SCG establishment procedure according to the first embodiment.

FIG. 7 is a sequence diagram showing details of signalling in the UE 3 in the SCG establishment procedure. In Step 701, the UE 3 configures a Master Cell Group (MCG) bearer (MCG DRB) of the MeNB 1. The configuration of this MCG bearer includes an EPS bearer Identity mapped to a DRB Identity of the MCG DRB.

Step 702 corresponds to Step 503 shown in FIG. 5. Specifically, in Step 702, an Access Stratum (AS) layer 31 of the UE 3 receives an RRC Connection Reconfiguration message from the MeNB 1. This RRC Connection Reconfiguration message is transmitted to establish an SCG bearer (SCG DRB) and includes an SCG configuration created by the SgNB 2. The AS layer 31 includes an RRC layer, a Packet Data Convergence Protocol (PDCP) layer, a Radio Link Control (RLC) layer, a Medium Access Control (MAC) layer, and a physical (PHY) layer. Further, the AS layer 31 includes an AS layer of the primary RAT (i.e., E-UTRA (LTE)) and an AS layer of the secondary RAT (i.e., NR). That is, in Step 702, the E-UTRA AS layer receives the RRC Connection Reconfiguration message.

In Step 703, the AS layer 31 of the UE 3 (i.e., the NR AS layer) performs layer-2 establishment for the SCG DRB.

Specifically, the AS layer 31 (i.e., the NR AS layer) establishes a PDCP entity and an SCG RLC entity in accordance with an SCG radio configuration contained in the RRC Connection Reconfiguration message.

In Step 704, the AS layer 31 (i.e., the NR AS layer or the E-UTRA AS layer) indicates the establishment of the SCG DRB(s) to an upper layer (i.e., a NAS layer 32). Further, the AS layer 31 (i.e., the NR AS layer or the E-UTRA AS layer) indicates the EPS bearer Identity (and the DRB Identity) of the established SCG DRB(s) to the NAS layer 32, along with flow-level QoS parameters associated with the SCG DRB(s). The flow-level QoS parameters include, for example, a Flow ID. The flow-level QoS parameters may further include a QoS management type.

In Step 705, the NAS layer 32 of the UE 3 maps the EPS bearer Identity (and the DRB Identity) of the SCG DRB to the Flow ID. In Step 706, if the NAS layer 32 receives the QoS management type, the NAS layer 32 stores it. In Step 707, the NAS layer 32 informs the AS layer 31 that the flow mapping has been successfully performed. Step 707 may be omitted. In Step 708, the AS layer 31 of the UE 3 (i.e., the E-UTRA AS layer) sends an RRC Connection Reconfiguration Complete message to the MeNB 1 in the E-UTRA cell (i.e., PCell) of the MeNB 1. Step 708 corresponds to Step 504 shown in FIG. 5.

The operation of the UE 3 shown in FIG. 7 allows the UE 3 to manage an NR SCG DRB, which is used in dual connectivity connected to the EPC 4 and using E-UTRA as the primary RAT and NR as the secondary RAT, in accordance with the same QoS framework as it manages NR DRBs in communication on the Standalone architecture as shown in FIG. 1.

Second Embodiment

This embodiment provides a modified example of the SCG establishment procedure described in the first embodiment. A configuration example of a radio communication network according to this embodiment is similar to that shown in FIG. 4. The first embodiment describes the establishment of an SCG bearer (SCG DRB) for E-UTRA-NR Dual Connectivity based on a procedure following the SeNB Addition procedure in LTE DC. Specifically, according to the procedure described in the first embodiment, the MeNB 1 configures an MCG bearer and then changes the configured MCG bearer to an SCG bearer, whereby the SCG bearer is configured in the SgNB 2. In contrast, a procedure described in this embodiment enables configuring an SCG bearer directly in the SgNB 2 without configuring an MCG bearer.

In this embodiment, the MME 5 is configured to, in response to receiving a Non-Access Stratum (NAS) request (e.g., Extended Service Request) from the UE 3 via the MeNB 1 associated with the primary RAT (E-UTRA), determine one or more flow-level QoS parameters, which conform to the QoS framework of the secondary RAT (NR), to be associated with one or more bearer-level QoS parameters, which conform to the QoS framework of the primary RAT (E-UTRA). The bearer-level QoS parameters and the flow-level QoS parameters are similar to those described in the first embodiment. That is, the bearer-level QoS parameters relate to an EPS bearer or an E-RAB and include, for example, an E-RAB ID and E-RAB Level QoS Parameters. Meanwhile, the flow-level QoS parameters relate to a QoS flow (or PDU flow). The flow-level QoS parameters include, for example, a flow identifier. The flow identifier may be a QoS flow ID, a PDU flow ID, or a Flow Identification Indicator (FII). The flow-level QoS parameters may further include at least one of flow QCI, flow priority, flow MBR, and flow ARP.

The MME 5 is further configured to send a bearer setup request including both the bearer-level QoS parameters and the flow-level QoS parameters to the MeNB 1. This bearer setup request causes the MeNB 1 to send a radio bearer setup request including both the bearer-level QoS parameters and the flow-level QoS parameters to the SgNB 2 associated with the secondary RAT (NR). This bearer setup request may be, for example, an S1AP: E-RAB Setup Request message.

Figure 8:
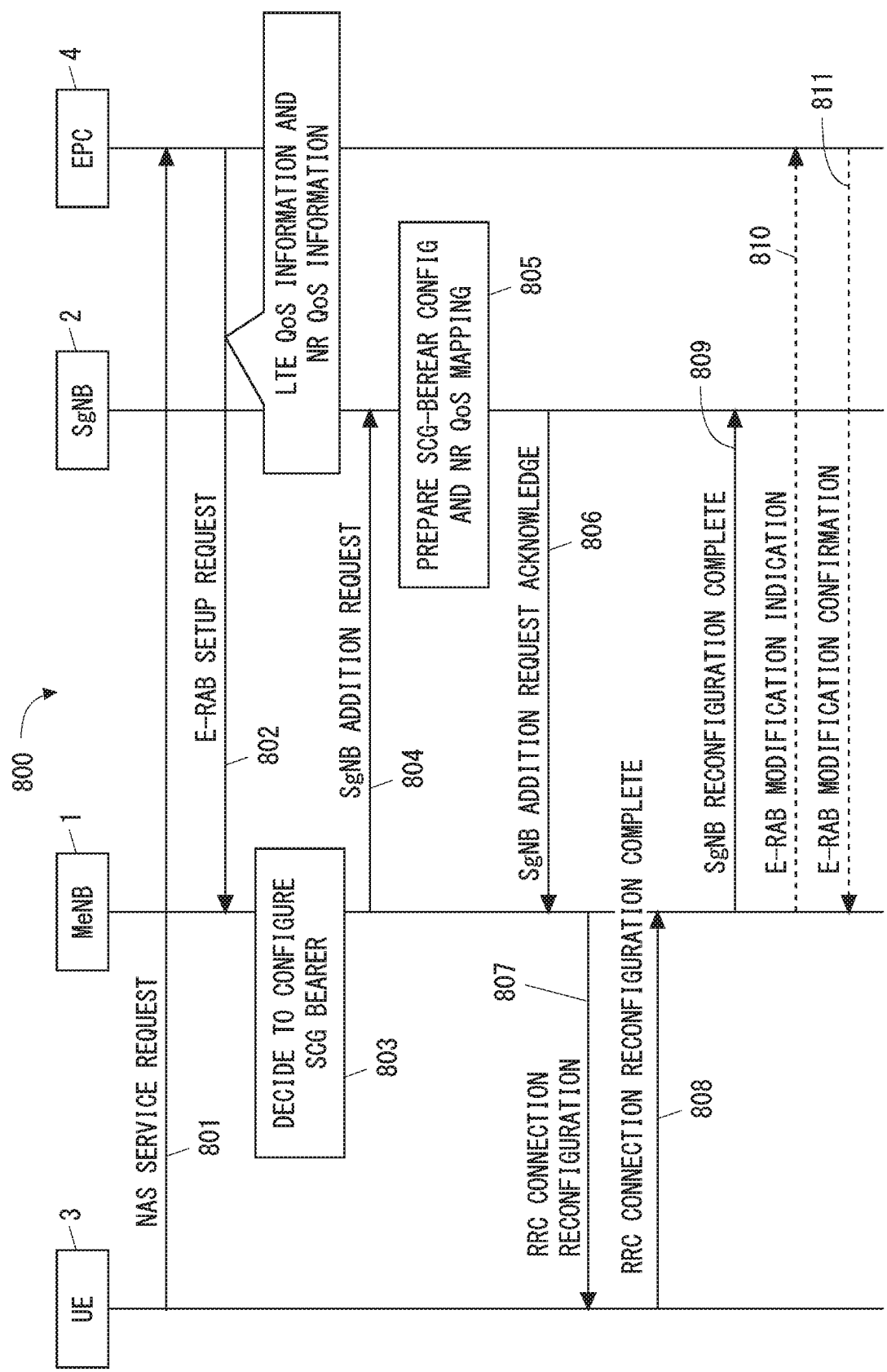
FIG. 8 is a sequence diagram showing an example of an SCG establishment procedure according to a second embodiment.

FIG. 8 is a sequence diagram showing a process 800 that is one example of an SCG establishment procedure according to this embodiment. In the example shown in FIG. 8, in response to receiving a NAS: Service Request message (Step 801) from the UE 3, the MME 5 sends an S1AP: E-RAB Setup Request message to the MeNB 1 (Step 802). This E-RAB Setup Request message includes both the LTE QoS information and the NR QoS information. The LTE QoS information is bearer-level QoS parameters (e.g., an E-RAB ID and E-RAB Level QoS parameters) conforming to the QoS framework of E-UTRA. The NR QoS information is flow-level QoS parameters (e.g., a Flow ID and PDU-flow-level QoS parameters) conforming to the QoS framework of NR.

In Step 803, the MeNB 1 determines which type of bearer, i.e., an MCG bearer, a split bearer, or an SCG bearer, is to be set up. In Step 804, in response to determining that an SCG bearer is to be set up, the MeNB 1 sends a radio bearer setup request (i.e., SgNB Addition Request message) to the SgNB 2. That is, even when the MeNB 1 determines to set up an SCG bearer, the MeNB 1 starts the SgNB Addition procedure to directly configure the bearer in the SgNB 2 without configuring an MCG bearer.

The SgNB Addition Request message in Step 804 includes both the LTE QoS information and the NR QoS information received from the MME 5.

In Step 805, the SgNB 2 stores the NR QoS information and creates a radio resource configuration for the SCG bearer. The radio resource configuration for the SCG bearer is created based on the received NR QoS information. In addition, at least a part of the radio resource configuration for the SCG bearer may be created based on the received LTE QoS information. The SgNB 2 prepares an SCG bearer configuration and maps the NR QoS information to the LTE QoS information.

In Step 806, the SgNB 2 sends an SgNB Addition Request Acknowledge message to the MeNB 1. This SgNB Addition Request Acknowledge message includes SCG DRB configuration information (radio resource configuration) created by the SgNB 2. This SCG DRB configuration information is sent to the UE 3 via the MeNB 1. This SCG DRB configuration information includes flow-level QoS parameters.

In Step 807, the MeNB 1 sends an RRC Connection Reconfiguration message to the UE 3 in response to receiving the SgNB Addition Request Acknowledge message from the SgNB 2. This RRC Connection Reconfiguration message includes the SCG DRB configuration information that has been sent to the MeNB 1 from the SgNB 2.

The UE 3 directly establishes an SCG DRB in accordance with the SCG DRB configuration information. The UE 3 further associates (or maps) an EPS bearer Identity with (or to) a Flow ID in accordance with the SCG DRB configuration. The processing performed here may be similar to the processing in Steps 703-706 shown in FIG. 7. Alternatively, in the example shown in FIG. 8, NAS information included in Step 702 may indicate establishment of a session (e.g., PDU session) for the secondary RAT (NR). In this case, the AS layer 31 may notify the NAS layer 32 of this NAS information and the NAS layer 32 may complete session establishment via the secondary RAT (NR).

In Step 808, the UE 3 sends an RRC Connection Reconfiguration Complete message to the E-UTRA cell (i.e., the PCell) of the MeNB 1. Meanwhile, the UE 3 starts a procedure for synchronizing with the SgNB 2 (e.g., Random Access Procedure).

In Step 809, the MeNB 1 sends an SgNB Reconfiguration Complete message to the SgNB 2 in response to receiving the RRC Connection Reconfiguration Complete message from the UE 3.

In Step 810, the MeNB 1 sends an E-RAB Modification Indication message to the MME 5. The E-RAB Modification Indication message requests for modification of the E-RAB that has already been established for the UE 3. In Step 811, the MME 5 sends an E-RAB Modification Confirmation message to the MeNB 1 in response to receiving the E-RAB Modification Indication message. Steps 810 and 811 may be omitted.

As can be understood from the above-described description, the MME 5 according to this embodiment determines both the bearer-level QoS parameters conforming to the QoS framework of E-UTRA and the flow-level QoS parameters conforming to the QoS framework of NR, and sends a bearer setup request including both of them to the MeNB 1. This bearer setup request causes the MeNB 1 to send a radio bearer setup request including both the bearer-level QoS parameters and the flow-level QoS parameters to the SgNB 2 associated with the secondary RAT (NR). This allows the SgNB 2 to manage the UE 3, which performs dual connectivity connected to the EPC 4 while using E-UTRA as the primary RAT and NR as the secondary RAT, in accordance with the same QoS framework as it manages other UEs communicating on the Standalone architecture as shown in FIG. 1.

Figure 9:
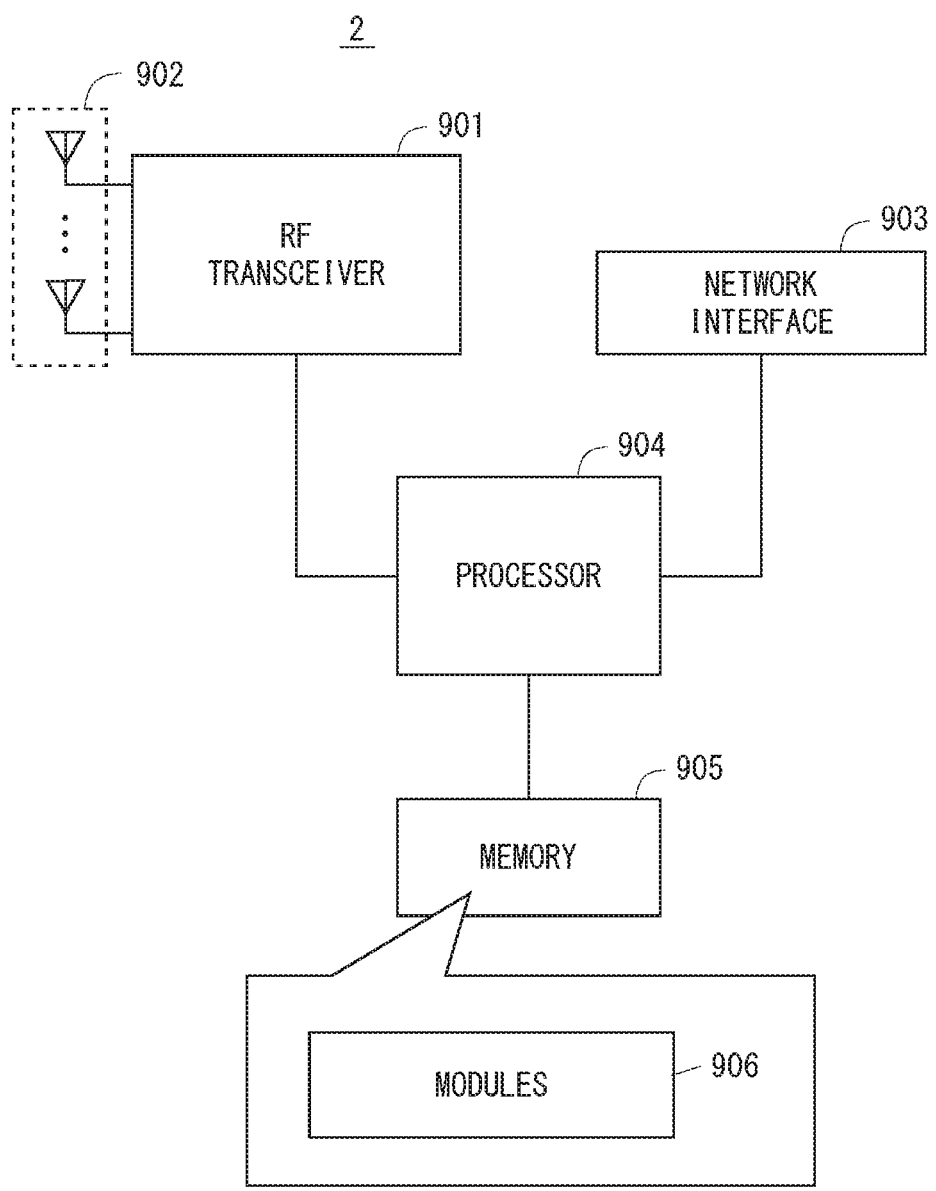
FIG. 9 is a block diagram showing a configuration example of an NR gNB according to a plurality of embodiments.

The following provides configuration examples of the LTE eNB 1, the NR gNB 2, the UE 3, and the MME 5 according to the above embodiments. FIG. 9 is a block diagram showing a configuration example of the NR gNB 2 according to the above embodiments. The configuration of the LTE eNB 1 may be similar to that shown in FIG. 9. Referring to FIG. 9, the NR gNB 2 includes a Radio Frequency transceiver 901, a network interface 903, a processor 904, and a memory 905. The RF transceiver 901 performs analog RF signal processing to communicate with NG UEs including the UE 3. The RF transceiver 901 may include a plurality of transceivers. The RF transceiver 901 is coupled to an antenna array 902 and the processor 904. The RF transceiver 901 receives modulated symbol data from the processor 904, generates a transmission RF signal, and supplies the transmission RF signal to the antenna array 902. Further, the RF transceiver 901 generates a baseband reception signal based on a reception RF signal received by the antenna array 902 and supplies the baseband reception signal to the processor 904. The RF transceiver 901 may include an analog beamformer circuit for beam forming. The analog beamformer circuit includes, for example, a plurality of phase shifters and a plurality of power amplifiers.

The network interface 903 is used to communicate with network nodes (e.g., the LTE eNB 1, the MME 5, and the S-GW 6). The network interface 903 may include, for example, a network interface card (NIC) conforming to the IEEE 802.3 series.

The processor 904 performs digital baseband signal processing (i.e., data-plane processing) and control-plane processing for radio communication. The processor 904 may include a plurality of processors. The processor 904 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 904 may include a digital beamformer module for beam forming. The digital beamformer module may include a Multiple Input Multiple Output (MIMO) encoder and a pre-coder.

The memory 905 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 905 may include a storage located apart from the processor 904. In this case, the processor 904 may access the memory 905 via the network interface 903 or an I/O interface (not shown).

The memory 905 may store one or more software modules (computer programs) 906 including instructions and data to perform processing by the gNB 2 described in the above embodiments. In some implementations, the processor 904 may be configured to load the software modules 906 from the memory 905 and execute the loaded software modules, thereby performing processing of the gNB 2 described in the above embodiments.

Figure 10:
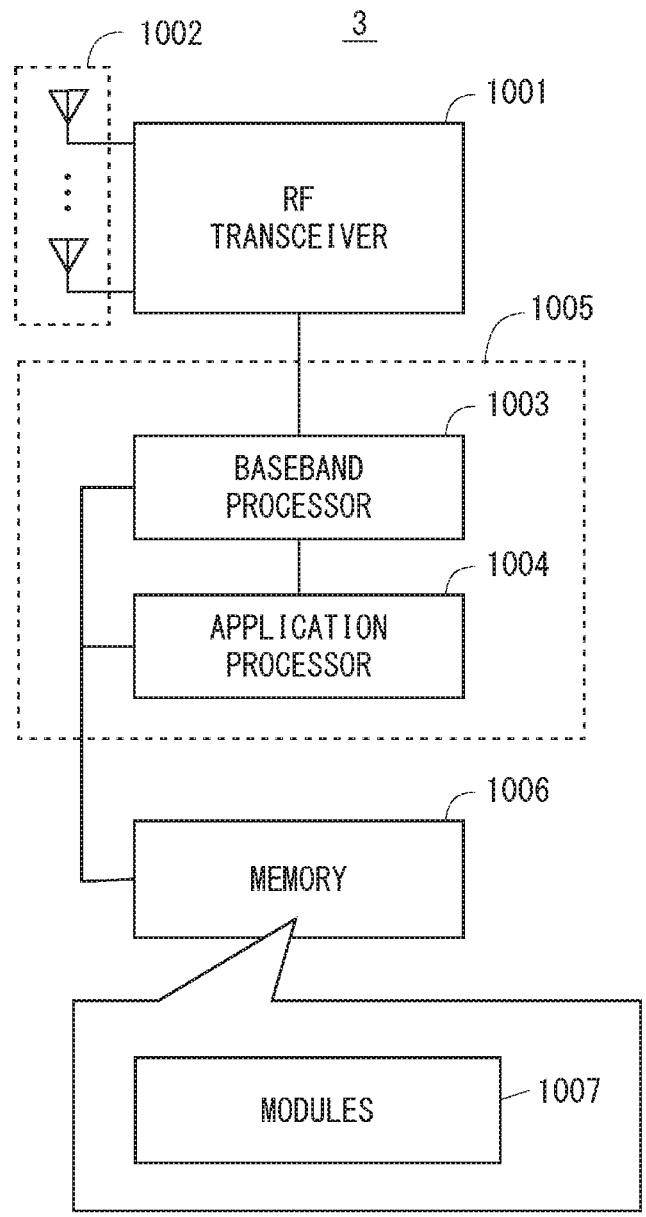
FIG. 10 is a block diagram showing a configuration example of a UE according to a plurality of embodiments.

FIG. 10 is a block diagram showing a configuration example of the UE 3. A Radio Frequency (RF) transceiver 1001 performs analog RF signal processing to communicate with the eNB 1 and the gNB 2. The RF transceiver 1001 may include a plurality of transceivers. The analog RF signal processing performed by the RF transceiver 1001 includes frequency up-conversion, frequency down-conversion, and amplification. The RF transceiver 1001 is coupled to an antenna array 1002 and a baseband processor 1003. The RF transceiver 1001 receives modulated symbol data (or OFDM symbol data) from the baseband processor 1003, generates a transmission RF signal, and supplies the transmission RF signal to the antenna array 1002. Further, the RF transceiver 1001 generates a baseband reception signal based on a reception RF signal received by the antenna array 1002 and supplies the baseband reception signal to the baseband processor 1003. The RF transceiver 1001 may include an analog beamformer circuit for beam forming. The analog beamformer circuit includes, for example, a plurality of phase shifters and a plurality of power amplifiers.

The baseband processor 1003 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1003 may include, for example, signal processing of a Packet Data Convergence Protocol (PDCP) layer, a Radio Link Control (RLC) layer, a MAC layer, and a PHY layer. Further, the control-plane processing performed by the baseband processor 1003 may include processing of a Non-Access Stratum (NAS) protocol, an RRC protocol, and MAC CEs.

The baseband processor 1003 may perform MIMO encoding and pre-coding for beam forming.

The baseband processor 1003 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1004 described in the following.

The application processor 1004 is also referred to as a CPU, an MPU, a microprocessor, or a processor core. The application processor 1004 may include a plurality of processors (processor cores). The application processor 1004 loads a system software program (Operating System (OS)) and various application programs (e.g., a call application, a WEB browser, a mailer, a camera operation application, and a music player application) from a memory 1006 or from another memory (not shown) and executes these programs, thereby providing various functions of the UE 3.

In some implementations, as represented by a dashed line (1005) in FIG. 10, the baseband processor 1003 and the application processor 1004 may be integrated on a single chip. In other words, the baseband processor 1003 and the application processor 1004 may be implemented in a single System on Chip (SoC) device 1005. An SoC device may be referred to as a system Large Scale Integration (LSI) or a chipset.

The memory 1006 is a volatile memory, a non-volatile memory, or a combination thereof. The memory 1006 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1006 may include, for example, an external memory device that can be accessed from the baseband processor 1003, the application processor 1004, and the SoC 1005. The memory 1006 may include an internal memory device that is integrated in the baseband processor 1003, the application processor 1004, or the SoC 1005. Further, the memory 1006 may include a memory in a Universal Integrated Circuit Card (UICC).

The memory 1006 may store one or more software modules (computer programs) 1007 including instructions and data to perform the processing by the UE 3 described in the above embodiments. In some implementations, the baseband processor 1003 or the application processor 1004 may load these software modules 1007 from the memory 1006 and execute the loaded software modules, thereby performing the processing of the UE 3 described in the above embodiments with reference to the drawings.

Figure 11:
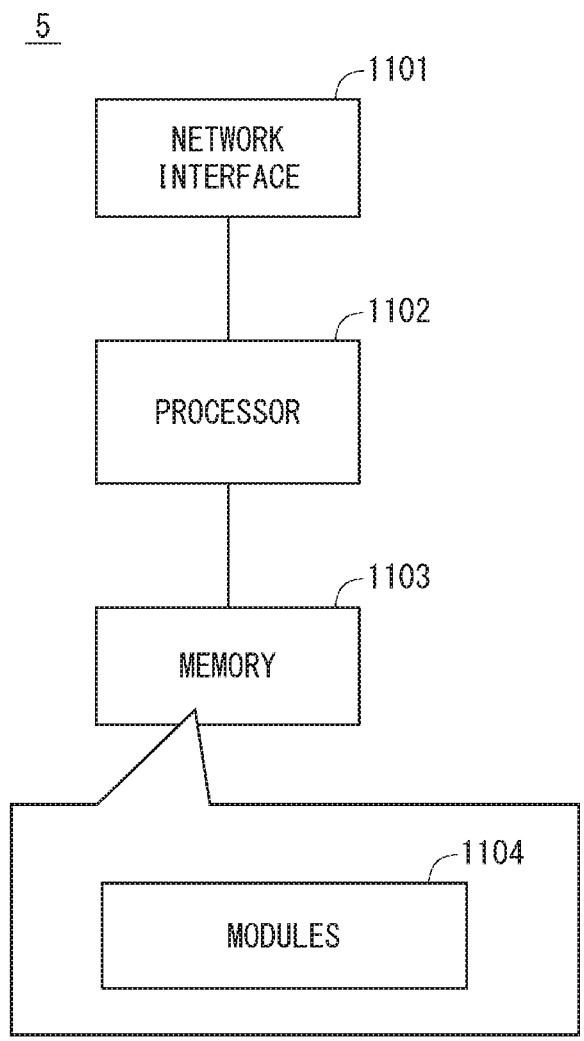
FIG. 11 is a block diagram showing a configuration example of a core network node according to a plurality of embodiments.

FIG. 11 is a block diagram showing a configuration example of the MME 5. Referring to FIG. 11, the MME 5 includes a network interface 1101, a processor 1102, and a memory 1103. The network interface 1101 is used to communicate with network nodes (e.g., RAN nodes and other core network nodes). The network interface 1101 may include, for example, a network interface card (NIC) conforming to the IEEE 802.3 series.

The processor 1102 may be a microprocessor, an MPU, or a CPU. The processor 1102 may include a plurality of processors.

The memory 1103 is composed of a combination of a volatile memory and a nonvolatile memory. The volatile memory is, for example, an SRAM, a DRAM, or a combination thereof. The non-volatile memory is, for example, an MROM, a PROM, a flash memory, a hard disc drive, or any combination thereof. The memory 1103 may include a storage located apart from the processor 1102. In this case, the processor 1102 may access the memory 1103 via the network interface 1101 or an I/O interface (not shown).

The memory 1103 may store one or more software modules (computer programs) 1104 including instructions and data to perform the processing of the MME 5 described in the above embodiments. In some implementations, the processor 1104 may be configured to load the one or more software modules 1104 from the memory 1103 and execute the loaded software modules, thereby performing the processing of the MME 5 described in the above embodiments.

As described above with reference to FIGS. 9, 10 and 11, each of the processors included in the eNB 1, the gNB 2, the UE 3, and the MME 5 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The above-described embodiments have mainly described as to the SCG bearer option of LTE (i.e., architecture option 3A). The configurations and operations of the apparatuses described in these embodiments may be used for the split bearer option of LTE (i.e., architecture option 3).

The above-described embodiments describe examples in which the SgNB Addition procedure following the SeNB Addition procedure is used. In the above-described embodiments, an SgNB Modification procedure which follows the SeNB Modification procedure may instead be used in place of the SgNB Addition procedure. The MeNB 1 may send, for example, an SgNB Modification Request message to the SgNB 2 in place of the SgNB Addition Request message (e.g., Step 501 shown in FIG. 5 and Step 601 shown in FIG. 6).

The MeNB 1 may perform UE Capability Coordination between the MeNB 1 and the SgNB 2 before sending the radio bearer setup request (e.g., the SgNB Addition Request message or the SgNB Modification Request message) to the SgNB 2. The MeNB 1 may send, for example, a UE Capability Coordination Request message to the SgNB 2, and receive a UE Capability Coordination Response message from the SgNB 2. In this Coordination, the MeNB 1 and the SgNB 2 may share (or negotiate) only a fixed UE capabilities (e.g., capabilities that are not substantially changed while data is being transmitted or received in DC, or hard-split capabilities), such as RF capability (e.g., Band combination, measurement capability). The MeNB 1 and the SgNB 2 may also negotiate static UE capabilities (e.g., capabilities that are not dynamically changed during DC, or dynamically-shared capabilities), such as capabilities related to the UE category specification (e.g., soft buffer/soft channel bit). Alternatively, the MeNB) 1 and the SgNB 2 may share static UE capabilities in the step of exchanging SeNB Addition Request/Acknowledge messages (or SeNB Modification Request/Acknowledge messages).

The Information Elements included in the messages described in the above-described embodiments (e.g., the SgNB Addition Request message, the SgNB Addition Request Acknowledge message, the RRC Connection Reconfiguration message, the RRC Connection Reconfiguration Complete message, the SgNB Reconfiguration Complete message, the E-RAB Modification Indication message, the E-RAB Modification Confirmation message, the NAS: Service Request message, the NAS: Extended Service Request message, the S1AP: E-RAB Setup Request message) are not limited to the above-described ones. The Information Elements contained in the above-described messages may be, for example, communicated and negotiated in directions or between nodes different from those described in the above embodiments for the purpose of performing DC between the LTE eNB 1 and the NR gNB 2. As a more specific example, at least some of the information elements included in the SgNB Addition Request message may be included in the SgNB Addition Request Acknowledge message. In addition or alternatively, at least a part of the information elements included in the SgNB Addition Request message may be included in the S1AP: E-RAB Setup Request message. It is possible to allow nodes related to DC performed between the LTE eNB 1 and the NR gNB 2 to share information needed for the DC.

The LTE eNB 1 and the NR gNB 2 described in the above embodiments may be implemented based on a Cloud Radio Access Network (C-RAN) concept. The C-RAN is also referred to as a Centralized RAN. In this case, processes and operations performed by each of the LTE eNB 1 and the gNB 2 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP). That is, processes and operations performed by each of the LTE eNB 1 and the gNB 2 described in the above embodiments may be provided by one or more radio stations (or RAN nodes).

Further, the above-described embodiments are merely examples of applications of the technical ideas obtained by the inventors. These technical ideas are not limited to the above-described embodiments and various modifications may be made thereto.

For example, the whole or part of the above embodiments can be described as, but not limited to, the following supplementary notes.

(Supplementary Note 1)

A second radio access network (RAN) node used in a radio communication system that supports dual connectivity involving a primary RAT and a secondary RAT and includes a common core network associated with the primary RAT, the second RAN node being associated with the secondary RAT, the second RAN node comprising:

a memory; and at least one processor coupled to the memory and configured to:

receive, from a first RAN node associated with the primary RAT, a radio bearer setup request indicating a bearer-level QoS parameter conforming to a Quality of Service (QoS) framework of the primary RAT;

configure a radio bearer of the secondary RAT based on the radio bearer setup request;

translate the bearer-level QoS parameter to a flow-level QoS parameter conforming to a QoS framework of the secondary RAT; and associate the flow-level QoS parameter with the radio bearer.

(Supplementary Note 2)

The second RAN node according to Supplementary Note 1, wherein the at least one processor is configured to send to a radio terminal, via the first RAN node, configuration information of the radio bearer of the secondary RAT, wherein the configuration information includes the flow-level QoS parameter.

(Supplementary Note 3)

The second RAN node according to Supplementary Note 1 or 2, wherein the bearer-level QoS parameter includes a network bearer identifier, and the flow-level QoS parameter includes a flow identifier to be associated with the network bearer identifier.

(Supplementary Note 4)

The second RAN node according to any one of Supplementary Notes 1 to 3, wherein the flow-level QoS parameter includes an information element indicating whether an uplink QoS management type is a reflective QoS, wherein, in the reflective QoS, mapping of a downlink flow to a radio bearer explicitly indicated by a marking added to a downlink packet is reflected in mapping of an uplink flow to a data bearer.

(Supplementary Note 5)

The second RAN node according to any one of Supplementary Notes 1 to 4, wherein the bearer-level QoS parameter includes at least one of a bearer QoS Class Identifier (QCI), a bearer Maximum Bit Rate (MBR), and a bearer Allocation and Retention Priority (ARP), and the flow-level QoS parameter includes at least one of a flow QCI, a flow priority, a flow MBR, and a flow ARP.

(Supplementary Note 6)

A radio terminal used in a radio communication system that supports dual connectivity involving a primary RAT and a secondary RAT and includes a common core network associated with the primary RAT, the radio terminal comprising:

at least one wireless transceiver configured to simultaneously communicate with a first radio access network (RAN) node associated with the primary RAT and a second RAN node associated with the secondary RAT; and at least one processor configured to receive, from the first RAN node, configuration information of a radio bearer of the secondary RAT for the dual connectivity, wherein the configuration information includes both a network bearer identifier conforming to a Quality of Service (QoS) framework of the primary RAT and a flow-level QoS parameter to be associated with the bearer identifier and conforming to a QoS framework of the secondary RAT.
(Supplementary Note 7)
The radio terminal according to Supplementary Note 6, wherein the flow-level QoS parameter includes a flow identifier.
(Supplementary Note 8)
The radio terminal according to Supplementary Note 7, wherein the at least one processor is configured to map the network bearer identifier to the flow identifier.
(Supplementary Note 9)
The radio terminal according to any one of Supplementary Notes 6 to 8, wherein the flow-level QoS parameter includes an information element indicating whether an uplink QoS management type is a reflective QoS,
wherein, in the reflective QoS, mapping of a downlink flow to a radio bearer explicitly indicated by a marking added to a downlink packet is reflected in mapping of an uplink flow to a data bearer.
(Supplementary Note 10)
The radio terminal according to any one of Supplementary Notes 6 to 9, wherein
the primary RAT is an Evolved Universal Terrestrial Radio Access (E-UTRA),
the common core network is an Evolved Packet Core (EPC), and
the network bearer identifier includes an EPS bearer Identity.
(Supplementary Note 11)
A core network node used in a radio communication system that supports dual connectivity involving a primary RAT and a secondary RAT and includes a common core network associated with the primary RAT, the core network node comprising:
 a memory; and
 at least one processor coupled to the memory and configured to:
  in response to receiving a Non-Access Stratum (NAS) request from a radio terminal via a first radio access network (RAN) node associated with the primary RAT, determine a flow-level QoS parameter to be associated with a bearer-level Quality of Service (QoS) parameter conforming to a QoS framework of the primary RAT, the flow-level QoS parameter conforming to a QoS framework of the secondary RAT; and
  send, to the first RAN node, a bearer setup request including both the bearer-level QoS parameter and the flow-level QoS parameter.
(Supplementary Note 12)
The core network node according to Supplementary Note 11, wherein the bearer setup request causes the first RAN node to send, to a second RAN node associated with the secondary RAT, a radio bearer setup request including both the bearer-level QoS parameter and the flow-level QoS parameter.
(Supplementary Note 13)
The core network node according to Supplementary Note 11 or 12, wherein
the bearer-level QoS parameter includes a network bearer identifier, and
the flow-level QoS parameter includes a flow identifier to be associated with the network bearer identifier.

(Supplementary Note 14)
The core network node according to any one of Supplementary Notes 11 to 13, wherein
the bearer-level QoS parameter includes at least one of a bearer QoS Class Identifier (QCI), a bearer Maximum Bit Rate (MBR), and a bearer Allocation and Retention Priority (ARP), and
the flow-level QoS parameter includes at least one of a flow QCI, a flow priority, a flow MBR, and a flow ARP.
(Supplementary Note 15)
A method for a second radio access network (RAN) node used in a radio communication system that supports dual connectivity involving a primary RAT and a secondary RAT and includes a common core network associated with the primary RAT, the second RAN node being associated with the secondary RAT, the method comprising:
 receiving, from a first RAN node associated with the primary RAT, a radio bearer setup request indicating a bearer-level QoS parameter conforming to a Quality of Service (QoS) framework of the primary RAT;
 configuring a radio bearer of the secondary RAT based on the radio bearer setup request;
 translating the bearer-level QoS parameter to a flow-level QoS parameter conforming to a QoS framework of the secondary RAT; and
 associating the flow-level QoS parameter with the radio bearer.
(Supplementary Note 16)
A method for a radio terminal used in a radio communication system that supports dual connectivity involving a primary RAT and a secondary RAT and includes a common core network associated with the primary RAT, the method comprising:
 receiving, from a first radio access network (RAN) node associated with the primary RAT, configuration information of a radio bearer of the secondary RAT for the dual connectivity,
 wherein the configuration information includes both a network bearer identifier conforming to a Quality of Service (QoS) framework of the primary RAT and a flow-level QoS parameter to be associated with the bearer identifier and conforming to a QoS framework of the secondary RAT.
(Supplementary Note 17)
A method for a core network node used in a radio communication system that supports dual connectivity involving a primary RAT and a secondary RAT and includes a common core network associated with the primary RAT, the method comprising:
 in response to receiving a Non-Access Stratum (NAS) request from a radio terminal via a first radio access network (RAN) node associated with the primary RAT, determining a flow-level QoS parameter to be associated with a bearer-level Quality of Service (QoS) parameter conforming to a QoS framework of the primary RAT, the flow-level QoS parameter conforming to a QoS framework of the secondary RAT; and
 sending, to the first RAN node, a bearer setup request including both the bearer-level QoS parameter and the flow-level QoS parameter.
(Supplementary Note 18)
A program for causing a computer to perform a method for a second radio access network (RAN) node used in a radio communication system that supports dual connectivity involving a primary RAT and a secondary RAT and includes a common core network associated with the primary RAT, the second RAN node being associated with the secondary RAT, wherein the method comprises:

receiving, from a first RAN node associated with the primary RAT, a radio bearer setup request indicating a bearer-level QoS parameter conforming to a Quality of Service (QoS) framework of the primary RAT;

configuring a radio bearer of the secondary RAT based on the radio bearer setup request;

translating the bearer-level QoS parameter to a flow-level QoS parameter conforming to a QoS framework of the secondary RAT; and associating the flow-level QoS parameter with the radio bearer.

(Supplementary Note 19)

A program for causing a computer to perform a method for a radio terminal used in a radio communication system that supports dual connectivity involving a primary RAT and a secondary RAT and includes a common core network associated with the primary RAT, wherein the method comprises:

receiving, from a first radio access network (RAN) node associated with the primary RAT, configuration information of a radio bearer of the secondary RAT for the dual connectivity, wherein the configuration information includes both a network bearer identifier conforming to a Quality of Service (QoS) framework of the primary RAT and a flow-level QoS parameter to be associated with the bearer identifier and conforming to a QoS framework of the secondary RAT.

(Supplementary Note 20)

A program for causing a computer to perform a method for a core network node used in a radio communication system that supports dual connectivity involving a primary RAT and a secondary RAT and includes a common core network associated with the primary RAT, wherein the method comprises:

in response to receiving a Non-Access Stratum (NAS) request from a radio terminal via a first radio access network (RAN) node associated with the primary RAT, determining a flow-level QoS parameter to be associated with a bearer-level Quality of Service (QoS) parameter conforming to a QoS framework of the primary RAT, the flow-level QoS parameter conforming to a QoS framework of the secondary RAT; and sending, to the first RAN node, a bearer setup request including both the bearer-level QoS parameter and the flow-level QoS parameter.

REFERENCE SIGNS LIST 1 eNodeB (eNB)
2 gNodeB (gNB)
3 User Equipment (UE)
4 Evolved Packet Core (EPC)
5 Mobility Management Entity (MME)
901 RF Transceiver
904 Processor
905 Memory
1001 RF Transceiver
1003 Baseband Processor
1004 Application Processor
1006 Memory
1102 Processor
1103 Memory

The invention claimed is:

1. A second radio access network (RAN) node used in a radio communication system that supports dual connectivity involving a primary RAT and a secondary RAT and includes a common core network associated with the primary RAT, the second RAN node being associated with the secondary RAT, the second RAN node comprising:

a memory; and at least one processor coupled to the memory and configured to:

receive, from a first RAN node associated with the primary RAT, a radio bearer setup request indicating a bearer-level QoS parameter conforming to a Quality of Service (QoS) framework of the primary RAT;

configure a radio bearer of the secondary RAT based on the radio bearer setup request;

translate the bearer-level QoS parameter to a flow-level QoS parameter conforming to a QoS framework of the secondary RAT; and associate the flow-level QoS parameter with the radio bearer of the secondary RAT.

2. The second RAN node according to claim 1, wherein the at least one processor is configured to send to a radio terminal, via the first RAN node, configuration information of the radio bearer of the secondary RAT, wherein the configuration information includes the flow-level QoS parameter.

3. The second RAN node according to claim 1, wherein the bearer-level QoS parameter includes a network bearer identifier, and the flow-level QoS parameter includes a flow identifier to be associated with the network bearer identifier.

4. The second RAN node according to claim 1, wherein the flow-level QoS parameter includes an information element indicating whether an uplink QoS management type is a reflective QoS, wherein, in the reflective QoS, mapping of a downlink flow to a radio bearer explicitly indicated by a marking added to a downlink packet is reflected in mapping of an uplink flow to a data bearer.

5. The second RAN node according to claim 1, wherein the bearer-level QoS parameter includes at least one of a bearer QoS Class Identifier (QCI), a bearer Maximum Bit Rate (MBR), and a bearer Allocation and Retention Priority (ARP), and the flow-level QoS parameter includes at least one of a flow QCI, a flow priority, a flow MBR, and a flow ARP.

6. A radio terminal used in a radio communication system that supports dual connectivity involving a primary RAT and a secondary RAT and includes a common core network associated with the primary RAT, the radio terminal comprising:

at least one wireless transceiver configured to simultaneously communicate with a first radio access network (RAN) node associated with the primary RAT and a second RAN node associated with the secondary RAT; and at least one processor configured to receive, from the second RAN node via the first RAN node, configuration information of a radio bearer of the secondary RAT for the dual connectivity, wherein the configuration information includes both a network bearer identifier conforming to a Quality of Service (QoS) framework of the primary RAT and a flow-level QoS parameter to be associated with the bearer identifier and conforming to a QoS framework of the secondary RAT.

7. The radio terminal according to claim 6, wherein the flow-level QoS parameter includes a flow identifier.

8. The radio terminal according to claim 7, wherein the at least one processor is configured to map the network bearer identifier to the flow identifier.

9. The radio terminal according to claim 6, wherein the flow-level QoS parameter includes an information element indicating whether an uplink QoS management type is a reflective QoS,
- wherein, in the reflective QoS, mapping of a downlink flow to a radio bearer explicitly indicated by a marking added to a downlink packet is reflected in mapping of an uplink flow to a data bearer.

10. The radio terminal according to claim 6, wherein
- the primary RAT is an Evolved Universal Terrestrial Radio Access (E-UTRA),
- the common core network is an Evolved Packet Core (EPC), and
- the network bearer identifier includes an EPS bearer Identity.

11. A method for a second radio access network (RAN) node used in a radio communication system that supports dual connectivity involving a primary RAT and a secondary RAT and includes a common core network associated with the primary RAT, the second RAN node being associated with the secondary RAT, the method comprising:
- receiving, from a first RAN node associated with the primary RAT, a radio bearer setup request indicating a bearer-level QoS parameter conforming to a Quality of Service (QoS) framework of the primary RAT;
- configuring a radio bearer of the secondary RAT based on the radio bearer setup request;
- translating the bearer-level QoS parameter to a flow-level QoS parameter conforming to a QoS framework of the secondary RAT; and
- associating the flow-level QoS parameter with the radio bearer of the secondary RAT.

* * * * *